Nov. 10, 1936.　　　G. G. MORENO　　　2,060,334
APPARATUS FOR INTERMITTENTLY ADVANCING STRIP FILM
Filed Jan. 16, 1934

Inventor
Gabriel G. Moreno
By Lyon & Lyon
Attorney

Patented Nov. 10, 1936

2,060,334

UNITED STATES PATENT OFFICE 2,060,334

APPARATUS FOR INTERMITTENTLY ADVANCING STRIP FILM

Gabriel G. Moreno, Los Angeles, Calif., assignor, by direct and mesne assignments, to C M C Corporation, New York, N. Y., a corporation of Delaware Application January 16, 1934, Serial No. 706,839

3 Claims. (Cl. 88—18)

The invention relates to a simple and efficient arrangement of elements whereby various existing devices for the treatment of strip film such as, for example, cameras, projectors, printers, and the like, may be readily adapted to intermittently advance strip film bearing photographic records of images, and the like.

Although the apparatus of this invention will be specifically described hereinafter as it pertains to the intermittent movement of the now standard 35 millimeter film, it is to be understood that strip film of various sizes, type of perforations or sprocket holes, etc., may be similarly treated, suitable, readily apparent modifications being made in the size and configuration of the illustrative form of apparatus herein described.

Normally, whenever it is desired to intermittently advance 35 millimeter film, intermittent sprockets having a diameter of about 24 millimeters and carrying 16 teeth are used. Such intermittent drive sprockets are driven in any suitable manner as, for example, by means of a star cam or Venetian movement designed to longitudinally advance the film a distance equivalent to the height of a normal frame area, namely, about 18.9 millimeters. When it is desired to change the length of film intermittently advanced, it has been thought necessary to change the entire intermittent movement, including star cam, etc., or to increase the size of the intermittent sprocket and gear it to the existing intermittent drive shaft so as to increase the peripheral speed of length of film advanced by the sprocket.

For example, a co-pending application, Serial No. 707,651, filed by me, issued November 12, 1935 which has now matured into U. S. Patent No. 2,020,564 describes a method of projecting cinematographic films in which it is desired to intermittently advance the film longitudinally a distance twice that advanced during normal projection or photography. It has been found, however, that when the driving sprocket is enlarged and geared to the existing drive shaft, the relationship between shutter speeds and film speed, or shutter speeds and periods of movement and rest of the film, are substantially changed so that proper projecting or photographing conditions do not exist.

Furthermore, it is to be remembered that in the normal intermittent drive means used heretofore, the film is constantly in contact with the intermittently driven sprocket and there is a tendency for mechanical vibrations to be transmitted to the film.

In accordance with the method of this invention, however, a transverse motion in a direction generally substantially perpendicular to the plane of the film, is imparted thereto and the film is alternately brought into contact and separated from a means for intermittently advancing the film. Moments of contact and of separation of film with a driving means are thus obtained.

During moments of separation of film from the driving means, the film may be positively registered and locked in a stationary position, thereby insuring proper registration and absence of longitudinal movement.

The invention, furthermore, contemplates the utilization of the normal existing intermittent film-advancing means with but a few minor modifications and the addition of a pivoted oscillating element, hereinafter referred to as a shoe, which slidably engages the film and periodically moves the film into and out of contact with the intermittently driven film-advancing means. The longitudinal distance that the film is advanced periodically may be easily varied and regulated without the necessity of materially changing the construction or driving mechanism of existing film-treating machines.

An object of the invention, therefore, is to disclose and provide means for intermittently advancing strip film longitudinally in which a transverse motion is imparted to the film to produce alternate movements of contact and of separation of the film with a driving means.

Another object of the invention is to disclose and provide a film-advancing mechanism whereby film may be intermittently and longitudinally advanced any desired distance in a simple and effective manner.

These and other objects, uses and advantages of the invention will become apparent to those skilled in the art from the following detailed description of a preferred method of carrying out the invention and an illustrative form of apparatus which may be used in the performance of the method.

In describing the invention, reference will be had to the appended drawing, in which Fig. 1 is a simplified, partly diagrammatic representation of a projection head which may be used in carrying out the method of this invention.

Figure 1:
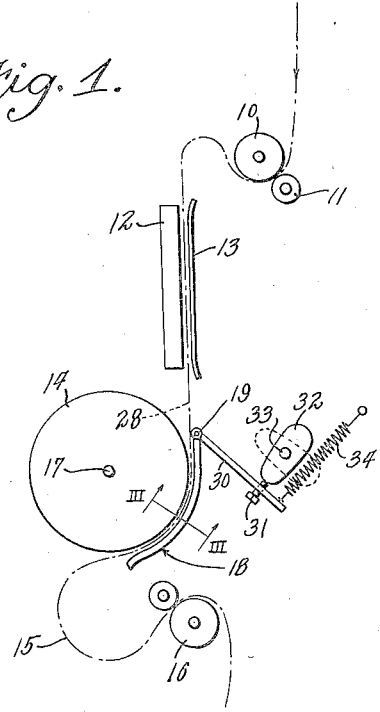

As shown in Fig. 1, the film, generally indicated by the dotted line, may pass from a suitable magazine, not shown, around a continuously driven feed sprocket 10. An adjustably positioned roller 11 retains the film in contact with such sprocket. The film may then pass through the space between the gate 12 and the presser plates 13. From this feeding point, the film passes into contact with an intermittently driven sprocket 14, from whence it then is discharged in the form of a loop, indicated at 15, and passes over a continuously driven take-up sprocket 16.

Normally, in the projection of ordinary 35 millimeter cinematographic film, the film is moved at the rate of 24 frames per second, the film therefore coming to rest 24 times every second and advancing longitudinally the distance of 1 frame between each of the periods of rest. The method of projection described in the co-pending application referred to hereinabove, contemplates movement of the film a longitudinal distance of 2 frames at a time, this movement being imparted to the film during the same time interval ordinarily required for a 1 frame movement, the film being thus stationary through a period of time normally allocated to moments of rest and movement of the film a distance of 1 frame.

In order to accomplish this result without the necessity of completely rebuilding existing photographic, printing or projection machines, this invention contemplates the substitution of an intermittently driven sprocket 14 having a periphery twice that of the normal sprocket. Instead of being provided with 16 teeth, the sprocket 14 is provided with 32 teeth. This sprocket 14 is mounted on the same shaft 17 on which the normal sprockets are generally mounted. The driven shaft 17, therefore, imparts motion to the sprocket 14, 24 times per second. In the event the film were to remain in contact with the sprocket 14 at all times, as is customary, then such sprocket 14 would advance the film a distance of 48 frames per second. In the performance of this method, however, it is desired that the normal length of film, namely, 24 frames, be advanced in 1 second, and in order to accomplish this result, an oscillating member or shoe, generally indicated at 18, is pivoted adjacent the periphery of the sprocket 14. The shoe 18 may be pivoted at 19 or at some point close to the lower edge of the gate 12. The shoe 18 is curved for a portion of its length so as to follow the circumference of the sprocket 14.

Figure 2:
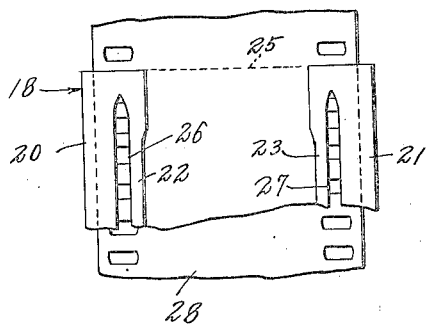
Fig. 2 is an enlarged front view of the shoe element used in Fig. 1.
Figure 3:
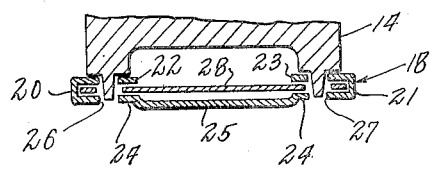
Fig. 3 is an enlarged section taken along the plane III—III indicated in Fig. 1.

The shoe 18 is shown in more detail in Figs. 2 and 3. It may comprise side channels 20 and 21 adapted to slidably engage the edge portions of the film exteriorly of the perforations. The face of the shoe 18, i. e., that side which faces the intermittently driven sprocket 14, may also be provided with longitudinally extending members 22 and 23 spaced from the inner edges of the flanges of the channels 20 and 21 a distance substantially equivalent to the width of sprocket holes or perforations in the edges of the film. The ends of these members 22 and 23 may be connected to the flanges 20 and 21 or merged therewith as indicated in Fig. 2.

The rear or convex portion of the shoe 18 may be provided with a back plate 24 having a central depressed (or cut-out) portion 25 so that only the edges of said rear plate 24 contact with the film at a point near the perforations and between the perforations and the picture area or sound track area of the film. The plate 24 may be connected with the side channels 20 and 21 near the ends of the shoe so as to leave openings 26 and 27 between the back flanges of the side channels 20 and 21 and the edges of the back plate 24. These longitudinal spaces 26 and 27 are opposed to the spaces between the members 22 and 23 and the side channels thereby permit the teeth of the sprocket 14 to protrude into such spaces 26 and 27 when the shoe is moved into position substantially against the intermittent sprocket, as shown in Fig. 3.

Although the sprocket 14 has been shown in Figs. 1 and 3 as a drum provided with spaced rows of sprocket teeth, it is to be understood that a light weight sprocket consisting of two narrow, spaced sprocket wheels may be used with just as satisfactory results as the drum type. The teeth carried by the sprocket should be sufficiently long to pass through one of the flanges of the side channels of the shoe 18, through the film slidably carried within the shoe, and into the apertures 26 and 27 of the back side of the shoe.

The shoe 18 may be oscillated on its pivot 19 in any suitable manner so as to bring the film indicated in dotted lines at 28, into engagement with the teeth of the intermittently driven sprocket 14 in timed relation with the movements of such sprocket. The means for oscillating the shoe 18 shown in the drawing comprise a lever 30 rigidly connected to the shoe 18. The lever 30 may be provided with an adjustable contact member 31, said contact member being adapted to slidably contact a cam 32 mounted upon a driven shaft 33. The size and configuration of this cam 32 will depend upon the speed of rotation of the shaft 33 with respect to the speed of the shaft 17 on which the sprocket 14 is mounted.

In substantially all film-handling machines such as cameras and projectors, a shaft 33 substantially in the position indicated in Fig. 1, is available, such shaft rotating at four times the speed of shaft 17. Under such conditions, the cam 32 is elliptical or double pointed. Means are provided for maintaining the contacting member 31 in contact with the cam 32 such as, for example, the spring 34.

In operation of the device described hereinabove, the shoe 18 and the film contained therein, are brought into substantial contact with the sprocket 14 when such sprocket is substantially at rest. Immediately thereafter, the sprocket is energized by the intermittent drive mechanism (not shown) and the film is advanced longitudinally, the sprocket teeth being in operative engagement with the film 28 slidably carried within the shoe 18. At the termination of such intermittent movement, the cam 32 is rotated sufficiently to cause the shoe 18 to disengage the film from the teeth of the sprocket 14. While so disengaged, the sprocket again partially rotates, but such partial rotation does not longitudinally advance the film as the film is not in engagement with the teeth of such sprocket. At the termination of this second rotation of the sprocket 14, the cam 32 has rotated sufficiently to advance the shoe 18 and film 28 carried thereby into operative engagement with the teeth of said sprocket.

The film is maintained in such engagement during the succeeding driving impulse supplied to the sprocket 14. The operations described hereinabove are then repeated. As a result, in the event the sprocket 14 has a diameter of twice that of the sprocket ordinarily employed, the film 28 is advanced a distance of two frames at a time but the total number of frames advanced per second is the same as the number of frames advanced in the customary camera or projector.

Figure 4:
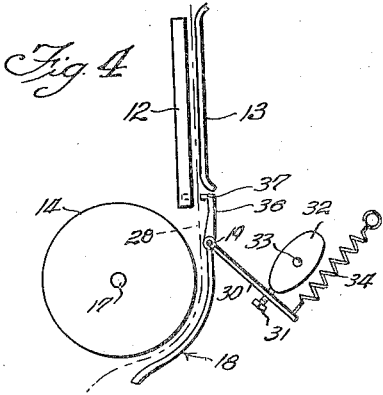
Fig. 4 is a modification of the device shown in Fig. 1.

During the period of rest, it may be desirable to lock the film 28 so as to positively prevent any longitudinal movement thereof. This may be accomplished by forming an extension 36 on the shoe 18, this extension being beyond the pivotal point 19 as shown in Fig. 4. The extension 36 may terminate in a pin or claw 37 adapted to work into and out of a socket formed in the lower portion of the gate 12. When the shoe 18 advances the film into engagement with the teeth of the sprocket 14, the pin or claw 37 is withdrawn from its socket and from contact with one of the perforations of the film, thereby permitting a longitudinal motion of the film when the sprocket 14 is energized. At the termination of such longitudinal advance, when this shoe 18 moves away from the sprocket, the pin 37 passes through a perforation in the edge of the film into its socket, thus locking the film from further longitudinal motion and insuring a proper positioning of the film during projection, printing, photography, or other work being done on the film during such period of time.

It will be obvious to those skilled in the art that in the event the shaft 33 rotates at some other ratio to shaft 17 than the 4 to 1 ratio mentioned hereinabove, the configuration of the cam 32 must be changed in order to obtain the proper timing between the oscillatory movement of the shaft 18 and the periodic movement of the intermittent sprocket 14. Moreover, the construction of the shoe 18 may be materially changed. That construction described hereinabove is advantageous in that the picture area of the film 28 does not come into sliding contact with any material portion of the shoe. The film contacts with the shoe only at areas adjacent these sprocket holes and as a result, the formation of scratches on the picture area of the film is prevented. If desired, the shoe 18 may be provided with a pressure plate on the convex side and opposite that portion of the shoe which embraces the teeth of the sprocket 14. The function of the pressure plate is to yieldably urge the film against the sprocket 14 or the teeth thereof. The curvature of the shoe 18 may be so arranged that 3 to 6 teeth of the sprocket 14 are in positive engagement with the film whenever the film carried by the shoe is brought into contact with the sprocket. Preferably, 4 to 6 teeth should thus contact with the film during the longitudinal advance of the film.

I claim:
1. A device for intermittently advancing strip film comprising a film-feeding means, an intermittently driven sprocket adapted to receive strip film from said film-feeding means, said sprocket having a peripheral speed appreciably in excess of normal linear speed of monochromatic film, and means for moving said film into and out of driving engagement with said intermittently driven sprocket during alternate periods of movement of said sprocket, said means comprising a shoe adapted to slidably engage edge portions of strip film, said shoe being pivoted at a point adjacent film travel from said film-feeding means to said intermittently driven sprocket, whereby said film is advanced a distance greater than a normal frame length during each period of film movement and is stationary for materially longer periods than normal monochromatic film.

2. A mechanism for intermittently advancing film longitudinally comprising an intermittently driven sprocket, a shoe pivoted near said sprocket, said shoe being adapted to slidably engage with edge portions of strip film, and means for moving said shoe on its pivot in timed relation to periods of movement of said driven sprocket to periodically move the film into driving engagement with said intermittently driven sprocket during alternate periods of rest of said sprocket and to move said film out of engagement during intermittent periods of rest, whereby the film is advanced by said sprocket only during alternate periods of movement of said sprocket, said last named means including a lever connected to said shoe, an adjustable contact member carried by said lever, a driven cam in operative contact with said contact member, and means for yieldably urging said contact member against said cam.

3. A mechanism for intermittently advancing film longitudinally, comprising a sprocket having twice the circumference and number of teeth of a normal intermittent drive sprocket; a shaft adapted to intermittently rotate said sprocket; a curved shoe pivoted near said sprocket, said shoe being adapted to slidably engage with edge portions of strip film, and means for moving said shoe and film carried thereby into engagement with said sprocket during alternate periods of rest of said sprocket and for moving said film out of engagement during intermittent periods of rest, whereby the film is in driving engagement only during alternate periods of movement of said sprocket.

GABRIEL G. MORENO.